Figure 1:
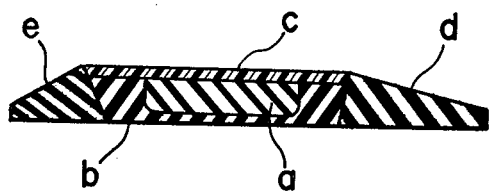

United States Patent [19]

Ohki

[11] 4,358,261
[45] Nov. 9, 1982

[54] MULTI-EXTRUSION DIE ASSEMBLY FOR THERMOPLASTIC MATERIALS

[75] Inventor: Masahiko Ohki, Toyota, Japan

[73] Assignee: Sumitomo Rubber Industries, Ltd., Hyogo, Japan

[21] Appl. No.: 295,081

[22] Filed: Aug. 21, 1981

[30] Foreign Application Priority Data

Aug. 28, 1980 [JP] Japan .................................. 55-119145

[51] Int. Cl.³ .............................................. B29F 3/04
[52] U.S. Cl. .................................. 425/131.1; 264/171;
264/177 R; 425/133.5; 425/186; 425/192 R;
425/462
[58] Field of Search .............. 425/131.1, 133.1, 133.5,
425/462, 113, 186, 192 R, 190; 264/177 R, 171

[56] References Cited

U.S. PATENT DOCUMENTS

| 2,096,362 | 10/1937 | Lehman | 264/177 R |
|---|---|---|---|
| 2,444,831 | 7/1948 | Kilborn | 425/192 R |
| 2,569,373 | 9/1951 | Fay | 425/131.1 |
| 2,897,543 | 8/1959 | Weston et al. | 425/190 |
| 3,099,859 | 8/1963 | Eilersen | 425/131.1 |
| 3,486,195 | 12/1969 | Greenwood | 425/192 R |
| 3,488,807 | 1/1970 | Vossen | 425/192 R |
| 3,849,045 | 11/1974 | Ohkawa et al. | 425/462 |
| 4,137,027 | 1/1979 | Rüger | 425/133.5 |
| 4,280,801 | 7/1981 | Wheeler, Jr. et al. | 425/462 |
| 4,316,710 | 2/1982 | Greenwood | 264/177 R |

FOREIGN PATENT DOCUMENTS

| 2457532 | 6/1976 | Fed. Rep. of Germany | 425/192 R |
|---|---|---|---|
| 55-15294 | 4/1980 | Japan | 264/171 |

*Primary Examiner*—Jeffery R. Thurlow
*Attorney, Agent, or Firm*—Birch, Stewart, Kolasch & Birch

[57] ABSTRACT

A multi-extrusion die assembly for use in a multi-extrusion arrangement for thermoplastic materials in which undesirable oozing out or exuding of thermoplastic material through mating surfaces between a die box and a preformer or deformation of extruded material at a second introducing passage, etc. are prevented through improvements on the disposition of extruders and constructions of the die box and preformer, while attaching and detaching of a block and a lower box with respect to the die box are facilitated for efficient extrusion.

2 Claims, 7 Drawing Figures

MULTI-EXTRUSION DIE ASSEMBLY FOR THERMOPLASTIC MATERIALS

The present invention generally relates to a multi-extrusion arrangement for thermoplastic materials which is arranged to simultaneously extrude various kinds of thermoplastic materials respectively having different characteristics so as to be formed into one unit during the extrusion, in predetermined relations therebetween with respect to parallelism, layer constructions, etc., and more particularly, to the improvements of disposition of extruders, and constructions of a multi-extrusion die assembly employed therein.

Generally, in the molded items of thermoplastic materials, for example, of rubber or plastics, there are those in which various constituents respectively different in materials, shades, etc. are three-dimensionally unified in complicated positional relations so as to form one product or part of such a product.

For example, in the field of pneumatic tires also, it has been a recent trend that the constructions thereof are becoming complicated with respect to the materials employed therefor.

By way of example, even when side wall portions of a pneumatic tire is taken up as shown in FIG. 1, the construction of each side wall portion is such that a black soiling prevention rubber layer b and an ozone resistant surface layer c are formed to surround a white side wall rubber layer a, and the portion contiguous to a buttress portion of the tread is constituted by a flexural fatigue resistant rubber layer d, while a clincher portion contiguous to the bead portion is desired to be formed by a still harder rubber layer e having a frictional resistance against the rim (not shown).

Figure 2:
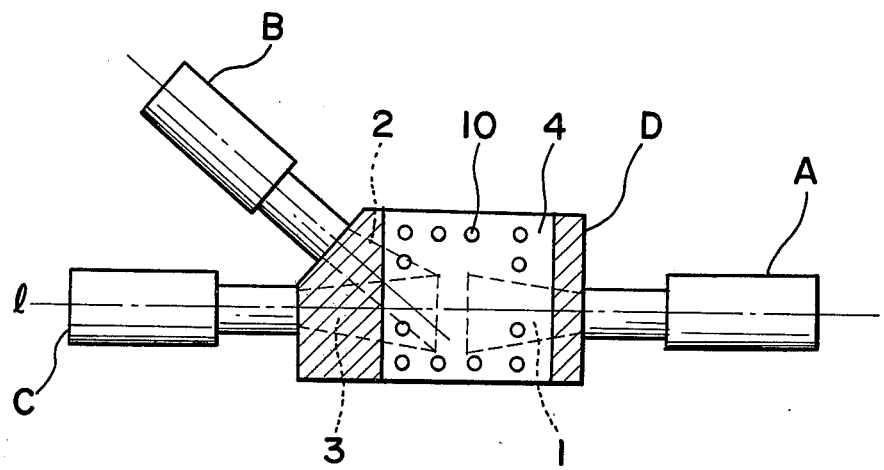
Figure 3:
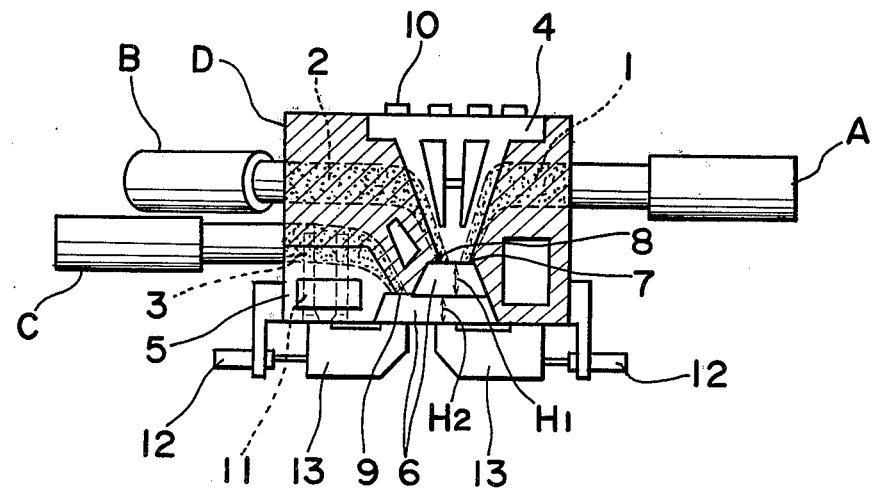

For molding a product or part of the product in which various constituents are assembled in the three-dimensional and complicated positional relations as described above, there has conventionally been employed, for example, a multi-extrusion arrangement as shown in FIGS. 2 and 3 which includes three extruders A, B and C arranged to centripetally extrude the thermoplastic material, and one die box D which is coupled to said extruders A, B and C in a manner as described hereinbelow.

In the known multi-extrusion arrangement as described above, an extruding port of the extruder A is coupled to one side face of the die box D to form a first passage 1 for introducing the thermoplastic material into the die box D, while extruding ports of the extruders B and C are each coupled to the other side face of said die box D so as to respectively form a second passage 2 and a third passage 3 also for introducing the thermoplastic material into said die box D. More specifically, a block 4 having a V-shaped cross section is fitted into a corresponding recess in the die box D from the upper surface of said die box to form the upper half portions of the first and second passages 1 and 2, while a lower box or female mold 5 is fitted into the die box D from the bottom surface of said die box to form the lower half portion of the third passage 3, and a preformer 6 is further fitted into the die box D from the bottom surface of said die box so as to connect outlets of said first, second and third introducing passages 1, 2 and 3 with corresponding preforming openings 7, 8 and 9 of said preformer 6. The block 4 and the lower box 5 are respectively fixed to the die box D by a plurality of securing bolts 10 and 11, while the preformer 6 is pushed up and held in position by wedges 13 selectively advanced or retracted by corresponding drive means, for example, hydraulic cylinders 12 and the like mounted on the die box D as shown.

The conventional die box having the construction as described above, however, has drawbacks as follow.

(1) Since the preforming openings 7, 8 and 9 of the preformer 6 are each formed in a flat upper surface thereof, the heights H1 and H2 of the preformer 6 do not perfectly agree with dimensions of the corresponding portions at the side of the die box D owing to dimensional errors related to processing accuracy of the preformer 6, thus resulting in formation of small clearances at the mating or fitting surfaces of the respective portions. Therefore, not only products having desired layer constructions are unavailable due to exuding or oozing out of the thermoplastic material (e.g. rubber material) through such clearances, but the preformer 6 generally constituted by two portions is heavy in weight, thus deteriorating workability especially during replacement of said preformer.

(2) Since a screw axis of the extruder B is not coincident with an extruding line 1, the inner face curve of the second passage 2 undesirably becomes unsymmetrical with respect to the widthwise direction thereof, and gives rise to alteration in the configuration of the second passage 2 due to influence by the deformation in the inner faces of the die box D through temperature variations, and viscosity alterations according to the state of mixing for preparing the thermoplastic material employed, and thus, it becomes impossible, in some cases, to obtain the desired extruding shapes (i.e. gauge).

(3) Owing to the arrangement in which the block 4 and lower box 5 heavy in weight are respectively secured to the die box D by many bolts 10 and 11 (normally ten to twelve bolts), much labor and time are required for attaching or detaching thereof, for example, in the case of cleaning during rubber replacement.

Accordingly, an essential object of the present invention is to provide a multi-extrusion die assembly for use in a multi-extrusion arrangement in which undesirable exuding of thermoplastic material through mating surfaces between a die box and a preformer, and deformation of molded items at a second introducing passage, etc. are prevented through improvements on the disposition of extruders and constructions of the die box and preformer, while attaching and detaching of a block and a lower box with respect to the die box are facilitated for efficient extrusion.

Another important object of the present invention is to provide a multi-extrusion die assembly of the above described type which is simple in construction and stable in functioning at high reliability, and can be readily manufactured at low cost.

In accomplishing these and other objects, according to one preferred embodiment of the present invention, there is provided a multi-extrusion die assembly for use in a multi-extrusion arrangement including at least three extruders centripetally arranged in the same vertical plane for extruding thermoplastic material, and one die box coupled to each of extruding ports of said extruders. The multi-extruding die assembly includes a first introducing passage formed by connecting the extruding port of one of the extruders to one side face of the die box for introducing the thermoplastic material extruded from the extruder into the die box along a path aligned with an extrusion line of the extruder in widthwise symmetrical relation with respect to the extrusion line, a second and a third introducing passages formed by respectively connecting the extruding ports of the other two of the extruders to the other side face of the die box for introducing thermoplastic material extruded from the other two of said extruders into the die box along paths aligned with extrusion lines of the extruders in widthwise symmetrical relation with respect to the extrusion lines, a block having a V-shaped cross section and detachably fitted into a corresponding recess formed in the die box from the upper surface of the die box so as to form upper half portions of the first and second introducing passages, a lower box detachably fitted into the die box from the bottom surface of said die box to form a lower half portion of the third introducing passage, and a preformer also detachably fitted into the die box from the bottom surface of said die box in such a manner that an upper edge of the preformer is spaced by a predetermined distance from a corresponding edge of the block, with an outlet port of the first introducing passage which extends over the block and die box being coupled to a preforming opening formed in one tapered face of the preformer, and with outlet ports of the second and third introducing passages which extends over the block, die box and lower box being respectively coupled to corresponding preforming openings formed in the other tapered face of the preformer. The block is depressed to be held in position in the die box through a plurality of taper pins selectively projected from or retracted into the die box by first driving means mounted on the die box, and the lower box is pushed up to be held in position by a taper pin driven by second driving means through a lever pivotally mounted on the die box, while the preformer is pushed up and held in position through wedge members selectively advanced or retracted by third driving means mounted on said die box.

By the arrangement according to the present invention as described above, an improved multi-extrusion die assembly for thermoplastic materials has been advantageously presented, with substantial elimination of disadvantages inherent in the conventional multi-extrusion die assemblies of this kind.

Figure 4:
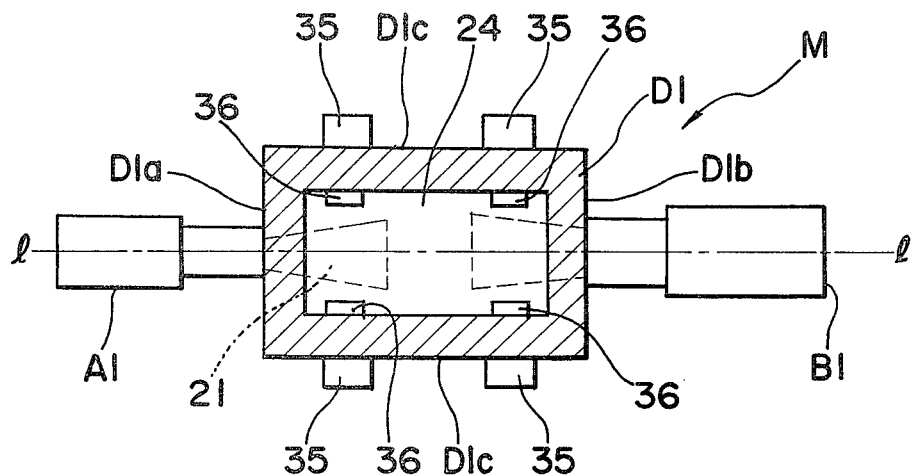
Figure 5:
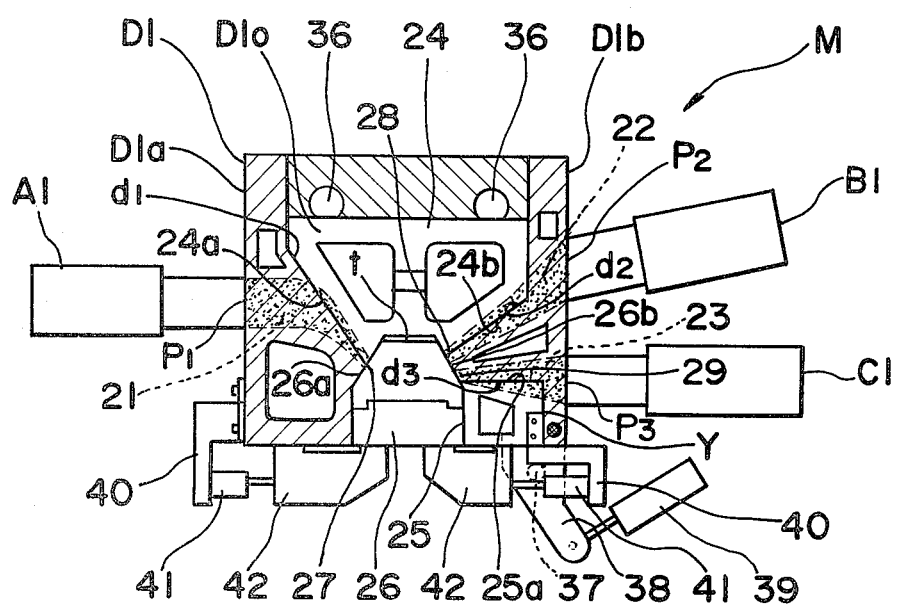
Figure 6:
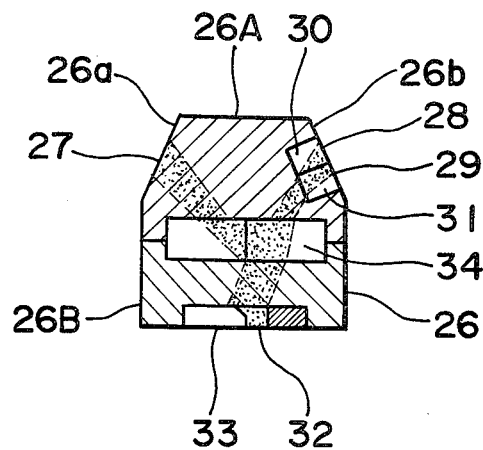
Figure 7:
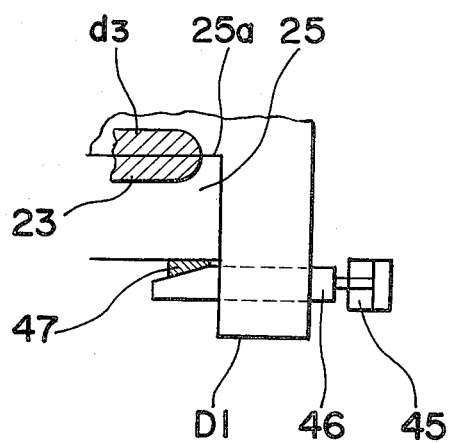

These and other objects and features of the present invention will become apparent from the following description taken in conjunction with the preferred embodiment thereof with reference to the accompanying drawings, in which;

FIG. 1 is a fragmentary cross sectional view of a pneumatic tire showing the construction of a side wall portion thereof (already referred to), FIG. 2 is a schematic top plan view, partly in section, of a conventional multi-extrusion arrangement (already referred to), FIG. 3 is a front elevational view of the multi-extrusion arrangement of FIG. 2 (already referred to), FIG. 4 is a top plan view, partly in section, of a multi-extrusion arrangement in which an improved multi-extrusion die assembly according to one preferred embodiment of the present invention is incorporated, FIG. 5 is a front elevational view, partly in section, of the multi-extrusion arrangement of FIG. 4, FIG. 6 is a side sectional view showing on an enlarged scale, the construction of a preformer employed in the arrangement of FIG. 4, and FIG. 7 is a fragmentary side elevational view showing, on an enlarged scale, the construction of a lower box push-up mechanism employed in the arrangement of FIG. 4.

Before the description of the present invention proceeds, it is to be noted that like parts are designated by like reference numerals throughout several views of the accompanying drawings.

Referring now to the drawings, there is shown in FIGS. 4 and 5, a multi-extrusion arrangement M in which an improved multi-extrusion die assembly according to one preferred embodiment of the present invention is incorporated. The arrangement M generally includes a first extruder A1, a second extruder B1 and a third extruder C1 which are centripetally arranged in the same vertical plane to extrude the thermoplastic material, and one die box D1 to which centrally collected extruding ports P1, P2 and P3 of the respective extruders A1, B1 and C1 are coupled in the manner as described hereinbelow. It is to be noted here that, for the extruders A1, B1 and C1, charge mastication type extruders, i.e. so-called cold-feed type extruders are preferable, but the types of extruders are not limited to the above, and hot-feed type extruders may be employed for the purpose as well.

More specifically, to the central portion of one side face D1a of the die box D1, the extrusion port P1 of the first extruder A1 is connected to form a first introducing passage 21 which introduces the thermoplastic material into the die box D1 through a path aligned with an extrusion line l of the extruder A1 in a widthwise symmetrical relation with respect to said line l.

Meanwhile, to the upper and lower portions (FIG. 5) of the other side face D1b of the die box D1, the extrusion ports P2 and P3 of the second and third extruders B1 and C1 are respectively coupled so as to form a second and a third introducing passages 22 and 23 which introduce the thermoplastic material into the die box D1 through corresponding paths aligned with respective extrusion lines l of the extruders B1 and C1 in widthwise symmetrical relations with respect to the respective extrusion lines l.

From the upper surface of the die box D1, a block 24 having a V-shaped cross section is detachably fitted into a corresponding recess D1o of the die box D1 to form the upper half portions of the first and second introducing passages 21 and 22. More specifically, in the inner tapered surfaces d1 and d2 at the lower portion of the recess D1o formed in the die box D1, the lower half portions of the first and second introducing passages 21 and 22 are respectively formed, and by being combined with the upper half portions defined by the corresponding tapered surfaces 24a and 24b of the block 24, the first and second introducing passages 21 and 22 are completed.

On the other hand, from the bottom surface of the die box D1, a lower box 25 is detachably fitted into the die box D1 at the right lower portion in FIG. 5 to form a lower half portion of the third introducing passage 23. In the above case also, the upper half portion of the third passage 23 is defined in the inner flat face d3 of the die box D1 so as to complete the third introducing passage 23 upon combination thereof with the lower half portion of an upper surface 25a of the lower box 25. Furthermore, from the central portion of the bottom wall of the die box D1, a preformer 26 is releasably fitted thereinto, with the upper edge of the preformer 26 being spaced a predetermined distance t from a corresponding edge of the block 24, and thus, the outlet of the first introducing passage 21 extending over the block 24 and die box D1 is connected to a preforming opening 27 formed in one tapered surface 26a of the preformer 26 (FIG. 6), while the outlets of the second and third introducing passages 22 and 23 extending over the block 24, die box D1 and lower box 25 are respectively coupled to preforming openings 28 and 29 formed in the other tapered surface 26b (FIG. 6) of the preformer 26.

More specifically, as shown in FIG. 6, the preformer 26 referred to above includes an upper portion 26A formed with the one tapered surface 26a having the preforming opening 27 and the other tapered surface 26b having first preforming plates 30 and 31 which are provided with the preforming openings 28 and 29, a lower half portion 26B having, at its bottom portion, a finish molding die plate 33 provided with a finish molding opening 32, and a second preforming plate 34 disposed between said upper and lower half portions 26A and 26B.

Referring back to FIGS. 4 and 5, the block 24 fitted into the die box D1 from the upper surface of said die D1 is depressed and held in position by taper pins, for example, four taper pins 36 movably mounted in opposite side walls D1c of the die box D1 and selectively projected from or retracted into the side walls D1c by corresponding driving means 35, for example, solenoids, hydraulic cylinders and the like, and by the close contact of the tapered surfaces 24a and 24b of the block 24 with the corresponding tapered surfaces d1 and d2 of the die box D1, exuding of the thermoplastic material through the mating surfaces of the first and second introducing passages 21 and 22 is advantageously prevented.

The lower box 25 described earlier is supported by a lever 38 pivotally connected to a pin 37 provided at the right lower portion of the die box D1 in FIG. 5, and pushed up and held in position through pivotal movement of the lever 38 by a driving means 39, for example, a hydraulic cylinder or the like connected thereto. Moreover, for preventing exuding of the thermoplastic material from the mating surfaces of the third introducing passage 23 through close contact of the upper surface 25a of the lower box 25 with the inner flat surface d3 of the die box D1, a pin 46 having a tapered portion at its forward end is extended through the die box D1 for reciprocation by a driving means 45, for example, another hydraulic cylinder or the like so that the tapered forward end of the pin 46 engages a tapered engaging block 47 provided on the bottom of the lower mold 25 as shown in FIG. 7. Furthermore, for preventing exuding of the thermoplastic material from mating surfaces Y (FIG. 5), other tapered engaging blocks (not shown) provided in the die box D1 are arranged to engage corresponding tapered portions (not shown) provided at opposite faces of the lower box 25.

Meanwhile, the preformer 26 is pushed up and held in position by wedges 42 which are selectively advanced towards each other or retracted away from each other by driving means 41, for example, corresponding hydraulic cylinders or the like mounted at the lower portions of the die box D1 via brackets 40, and through close contact of the tapered surface 26a of the preformer 26 with the corresponding surfaces of the die box D1 and block 24, and also close contact of the tapered surface 26d thereof with the corresponding surfaces of the die box D1, block 24 and lower box 25 respectively, undesirable oozing out or exuding of the molding material through mating surfaces between the outlets of the first, second and third introducing passages 21, 22 and 23 and the preforming openings 27, 28 and 29 is advantageously prevented.

As is seen from the foregoing description, with the extruders A1, B1 and C1 coupled to the die box D1 in the manner as described hereinabove, if the mountings of the preformer 26, block 24, lower box 25, etc. are properly arranged, the thermoplastic material to be extruded from the extruders A1, B1 and C1 is not readily affected by the positional difference of the box inner surfaces at the left and right sides of the die box D1, since the thermoplastic material extruded from the extruders A1, B1 and C1 is guided by the first, second and third introducing passages 21, 22 and 23 whose inner face curves are respectively in the symmetrical relations widthwise with respect to the corresponding extruding lines, and thus, the desired extruding shapes (gauge) are guaranteed.

Meanwhile, owing to the arrangement that the thermoplastic material guided by the first, second and third introducing passages 21, 22 and 23 are successively introduced into the preforming openings 27, 28 and 29 in the tapered surfaces 26a and 26b of the preformer 26 through the outlets of said passages 21, 22 and 23, the undesirable oozing out, i.e. exuding of the thermoplastic material through the fitting surfaces is eliminated by the highly accurate close contact at the inclined surfaces 26a and 26b of the preformer 26.

The thermoplastic material introduced into the preforming openings 27, 28 and 29 of the preformer 26 are successively extruded outwardly through the second preforming plate 34 and the finish forming die plate 33 in the form of products having desired layer constructions and extruded shapes.

For cleaning the interior of the die box during replacement of the thermoplastic material, upon retraction of the taper pins 36 by the driving means 35, the block 24 may be quickly detached or attached due to releasing of the suppression by the pins 36. Similarly, the preformer 26 can be readily detached or attached through releasing of the wedges 42 by the operation of the driving means or hydraulic cylinders 41, while the box 25 may also be easily detached or attached by releasing the depression through withdrawal of the taper pin 46 by the operation of the driving means 45, and causing the lever 38 to pivot downward by the driving means 39.

As is clear from the foregoing description, according to the present invention, owing to the arrangement that the inner face curves of the first, second and third introducing passages formed in the die box are all aligned with the extruding lines of the extruders so as to be symmetrical in the widthwise direction, the thermoplastic material is not readily affected by the positional difference of the left and right inner faces of the die box, and thus, desired extruding shapes (gauge) may be readily achieved.

Moreover, since the fitting surfaces between the preformer, and die plate, block and lower box are formed into the tapered surfaces, close contact at high accuracy is achieved at the fitting surfaces, with reduced oozing out or exuding of the thermoplastic material thereat, and therefore, products of desired layered constructions can be obtained.

Furthermore, since the block, lower box, and preformer are depressed or pushed up to be held in positions through the taper pins, lever, wedges, etc. coupled to the driving means, detaching or attaching thereof are rapidly effected, with consequent improvement of the working efficiency.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as inlcuded therein.

What is claimed is:

1. A multi-extrusion die assembly for use in a multi-extrusion arrangement including at least three extruders centripetally arranged in the same vertical plane for extruding thermoplastic material, and one die box coupled to each of extruding ports of said extruders, said multi-extruding die assembly comprising a first introducing passage formed by connecting the extruding port of one of said extruders to one side face of said die box for introducing the thermoplastic material extruded from said extruder into said die box along a path aligned with an extrusion line of said extruder in widthwise symmetrical relation with respect to said extrusion line, a second and a third introducing passages formed by respectively connecting the extruding ports of the other two of said extruders to the other side face of said die box for introducing thermoplastic material extruded from said the other two of said extruders into said die box along paths aligned with extrusion line of said extruders in widthwise symmetrical relation with respect to said extrusion lines, a block having a V-shaped cross section and detachably fitted into a corresponding recess formed in the die box from the upper surface of said die box so as to form upper half portions of said first and second introducing passages, a lower box detachably fitted into the die box from the bottom surface of said die box to form a lower half portion of said third introducing passage, and a preformer also detachably fitted into the die box from the bottom surface of said die box in such a manner that an upper edge of said preformer is spaced by a predetermined distance from a corresponding edge of said block, with an outlet port of said first introducing passage which extends over said block and said die box being coupled to a preforming opening formed in one tapered face of said preformer, and with outlet ports of said second and third introducing passages which extend over said block, said die box and said lower box being respectively coupled to corresponding preforming openings formed in the other tapered face of said preformer, said block being depressed to be held in position in the die box through a plurality of taper pins selectively projected from or retracted into the die box by first driving means mounted on said die box, said lower box being pushed up to be held in position by a taper pin driven by second driving means through a lever pivotally mounted on said die box, said preformer being pushed up and held in position through wedge members selectively advanced or retracted by third driving means mounted on said die box.

2. A multi-extrusion die assembly as claimed in claim 1, wherein said first, second, and third driving means are respectively of hydraulic cylinders.

* * * * *